United States Patent
Levin

(10) Patent No.: US 7,958,912 B2
(45) Date of Patent: Jun. 14, 2011

(54) FREEZE PROTECTION FOR ON-BOARD VEHICLE EMISSIONS TREATMENT SYSTEM

(75) Inventor: Michael Levin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 12/502,422

(22) Filed: Jul. 14, 2009

(65) Prior Publication Data

US 2009/0272440 A1    Nov. 5, 2009

Related U.S. Application Data

(62) Division of application No. 11/163,294, filed on Oct. 13, 2005, now Pat. No. 7,578,321.

(51) Int. Cl.
*B60K 15/04* (2006.01)

(52) U.S. Cl. ............ 141/50; 141/5; 141/55; 141/82; 141/85; 141/100; 60/286

(58) Field of Classification Search ......... 141/5, 25, 141/37, 50, 55, 65, 82, 85, 89, 100; 60/283, 60/284, 286; 137/59

See application file for complete search history.

(56) References Cited

U.S. PATENT DOCUMENTS

| | | | |
|---|---|---|---|
| 2,529,937 A | 11/1950 | Hale | |
| 2,758,747 A | 8/1956 | Stevens | |
| 3,662,929 A | 5/1972 | Sims | |
| 4,700,864 A | 10/1987 | Galles et al. | |
| 5,553,637 A | 9/1996 | Hoeptner, III | |
| 5,568,828 A | 10/1996 | Harris | |
| 5,657,734 A | 8/1997 | Sawamoto et al. | |
| 5,680,756 A | 10/1997 | Harima | |
| 6,063,350 A | 5/2000 | Tarabulski et al. | |
| 6,082,629 A | 7/2000 | Lee et al. | |
| 6,216,755 B1 * | 4/2001 | Neufert | 141/100 |
| 6,289,947 B1 | 9/2001 | Heimbrodt et al. | |
| 6,463,965 B1 | 10/2002 | Rasche et al. | |
| 6,554,031 B2 | 4/2003 | Channing | |
| 6,557,595 B2 | 5/2003 | Ozaki | |
| 6,561,209 B2 | 5/2003 | Wojan et al. | |
| 6,622,510 B2 | 9/2003 | Giroux et al. | |
| 6,681,811 B2 | 1/2004 | Channing | |

(Continued)

FOREIGN PATENT DOCUMENTS

DE            2245657 A      3/1974

(Continued)

*Primary Examiner* — Gregory L Huson
*Assistant Examiner* — Nicholas A Arnett
(74) *Attorney, Agent, or Firm* — Julia Voutyras; Brooks Kushman P.C.

(57) ABSTRACT

Freeze protection of an on-board emissions treatment substance storage and distribution system in a vehicle includes moving the emissions treatment substance away from a primary fuel/vapor area after filling of the emissions treatment system. In one embodiment an on-board emissions treatment system has a fill tube with a portion extending into a primary fuel fill tube to facilitate co-fueling of the primary fuel and emissions treatment substance. A pressure differential or vacuum is created in the emissions treatment fill tube after filling to move the emissions treatment substance away from a check valve disposed at the terminal end of the fill tube to prevent freezing of the check valve after filling. The emissions treatment substance may be moved out of the co-located portion of the fill tube to an area where passive or active heating of the fill tube may be applied to further reduce susceptibility to freezing.

19 Claims, 2 Drawing Sheets

U.S. PATENT DOCUMENTS

| | | |
|---|---|---|
| 6,782,908 B2 | 8/2004 | Lee et al. |
| 6,810,661 B2 | 11/2004 | Lambert et al. |
| 6,886,705 B2 | 5/2005 | Souma et al. |
| 6,990,963 B2 | 1/2006 | Hara et al. |
| 7,013,924 B1 | 3/2006 | Meyers et al. |
| 2003/0056837 A1 | 3/2003 | Benjey |
| 2003/0150507 A1 | 8/2003 | Channing |
| 2004/0025498 A1 | 2/2004 | Lambert et al. |
| 2004/0047783 A1 | 3/2004 | Huber et al. |
| 2004/0179960 A1 | 9/2004 | Lenke |

FOREIGN PATENT DOCUMENTS

| | | |
|---|---|---|
| JP | 2005248823 A | 9/2005 |
| WO | 2006037155 A2 | 4/2006 |

* cited by examiner

FREEZE PROTECTION FOR ON-BOARD VEHICLE EMISSIONS TREATMENT SYSTEM

CROSS-REFERENCE TO RELATED APPLICATION

This application is a divisional of commonly owned and U.S. application Ser. No. 11/163,294 filed Oct. 13, 2005, now U.S. Pat. No. 7,578,321, the disclosure of which is hereby incorporated by reference in its entirety.

BACKGROUND

1. Technical Field

The present disclosure relates to systems and methods for controlling an on-board emissions treatment system of a vehicle.

2. Background Art

Manufacturers of vehicles and internal combustion engines used in a variety of diverse applications are continually striving to improve engine/vehicle fuel economy and performance while reducing emissions. Effective emission control strategies often include control of the combustion event in addition to various devices that treat the exhaust before it reaches the atmosphere. Various types of emission control systems introduce one or more substances directly or indirectly to the engine via the fuel supply, air/fuel intake, exhaust, or directly to an engine cylinder or emissions control device, such as a catalyst. For example, substances acting as reducing agents or reductants, such as aqueous urea or hydrocarbons (other than fuel) may be used in lean air/fuel ratio engine applications including diesel engines in combination with lean NOx catalysts (or selective catalytic reduction (SCR)) to treat nitrous oxide feedgas emissions. These substances generally require a storage and distribution system separate from the primary fuel storage and distribution system that must accommodate physical properties different from the primary fuel, such as being more vulnerable to freezing, for example.

Appropriate positioning of the emissions treatment substance storage reservoir and distribution system next to heat rejecting elements of the engine/vehicle, or an active heating element or device, may be required to assure proper operation of the emissions treatment system in extreme environments. However, due to the combustibility of the primary fuel and/or fuel vapor, these approaches may be problematic in applications where the emissions treatment system and primary fuel supply share a common space. For example, U.S. Pat. Nos. 6,554,031 and 6,216,755 disclose a dispensing system that may be used to simultaneously supply a primary fuel and an emissions treatment substance through an integrated nozzle to respective supply tubes integrated within a common fill tube or pipe of a vehicle. This process, which may also be referred to as co-fueling, is one example of an application where a portion of the emissions treatment substance system may be susceptible to freezing, and is not amenable to direct heating due to the presence of primary fuel and fuel vapor.

SUMMARY

A system and method for controlling an on-board emissions treatment substance storage and distribution system in a vehicle include moving the emissions treatment substance away from a primary fuel/vapor area after filling of the emissions treatment system.

Embodiments of the present disclosure include an on-board emissions treatment system having a fill tube with a portion extending into a primary fuel fill pipe to facilitate co-fueling of the primary fuel and emissions treatment substance. A pressure differential or vacuum is created in the emissions treatment fill tube after filling to move the emissions treatment substance away from a check valve disposed at the terminal end of the fill tube to prevent freezing of the check valve after filling. The emissions treatment substance may be moved out of the co-located portion of the fill tube to an area where passive or active heating of the fill tube may be applied to further reduce susceptibility to freezing, or to thaw areas that may freeze during long exposures to extreme cold without operating the system. In one embodiment, the on-board emissions-treatment system includes a bladder-accumulator storage reservoir to store aqueous urea. An air pump operates to create negative pressure within the storage tank after filling so that the bladder expands drawing air into the urea fill tube and moving the urea away from the check valve. The air pump is subsequently used to create a positive pressure within the urea storage tank that acts on the bladder to deliver urea to an emissions treatment device, such as a lean NOx catalyst.

The present disclosure provides a number of advantages. For example, the present disclosure moves the emissions treatment substance away from the filling area after filling to reduce freezing susceptibility of the substance within the fill tube and associated fill tube components, such as a check valve, for example. The present disclosure does not require heating of the emissions treatment substance to reduce the possibility of freezing of fill-related components. For applications that include heating of the emissions treatment substance, the present disclosure moves the emissions treatment substance away from the primary fuel/vapor area to an area where it can be passively or actively heated to further reduce the possibility of freezing while eliminating the possibility of heating the primary fuel to avoid additional fuel vaporization.

The above advantages and other advantages and features will be readily apparent from the following detailed description of the preferred embodiments when taken in connection with the accompanying drawings.

DETAILED DESCRIPTION

As those of ordinary skill in the art will understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
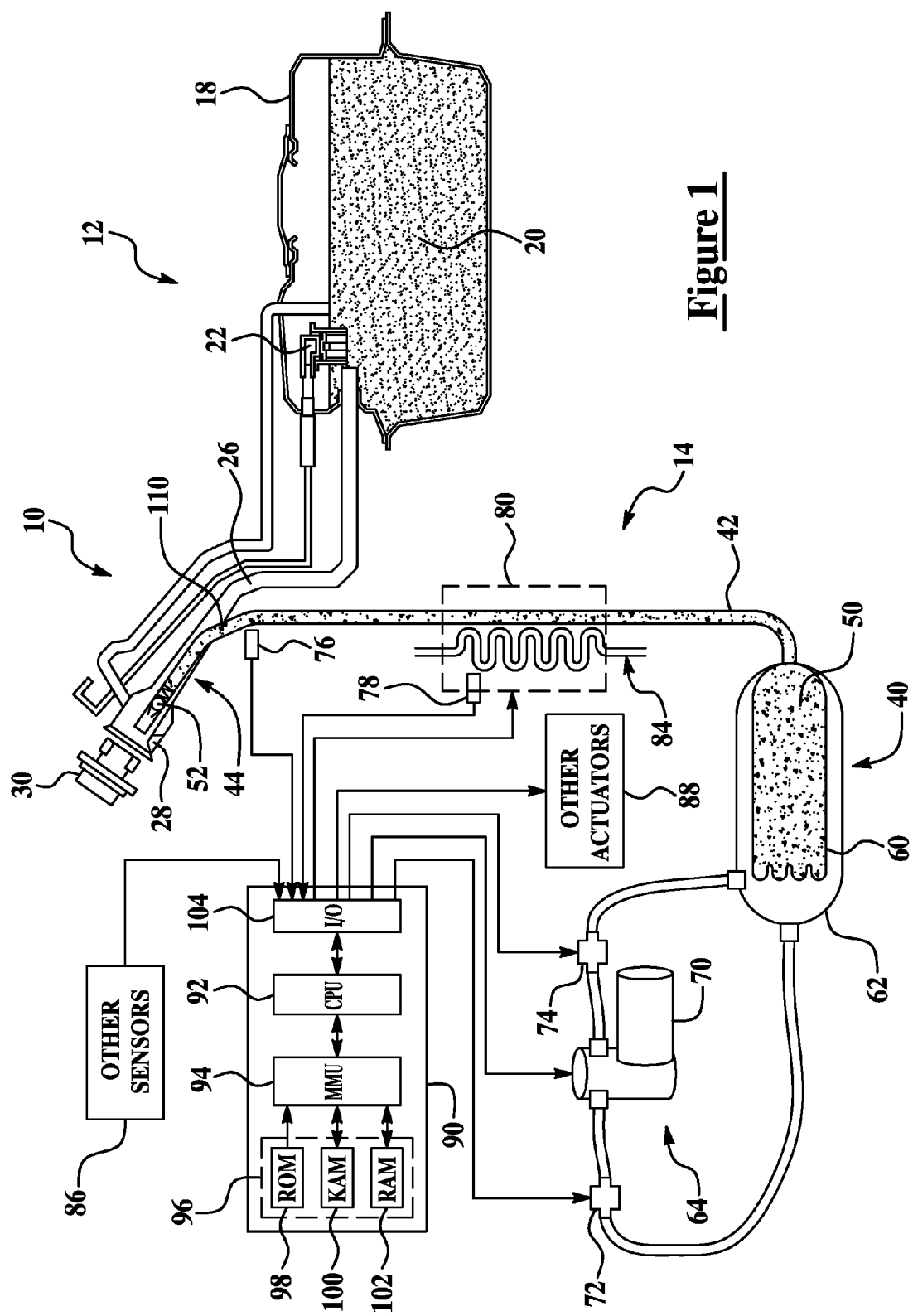
FIG. 1 is a block diagram illustrating one embodiment of a system or method for controlling an on-board vehicle emissions treatment system according to the present disclosure.

Referring now to FIG. 1, a block diagram illustrating one embodiment of a system or method for controlling an onboard vehicle emissions treatment system according to the present disclosure is shown. System 10 includes a primary fluid storage and distribution system 12 and a secondary fluid storage and distribution system 14 that are mounted on a vehicle (not shown). In one representative application, primary fluid system 12 is used for storage and distribution of fuel used to power an internal combustion engine and secondary fluid system 14 is used for storage and distribution of an emissions treatment substance. As an example, primary fluid system 12 may be used to store diesel fuel for a compression ignition engine and secondary fluid system 14 may be used to store an emissions treatment substance, which may include, but is not limited to various reducing agents or reductants such as aqueous urea, hydrocarbons (other than the primary fuel), etc. Primary fluid system 12 includes a primary fluid storage tank 18 for storing primary fluid 20. Primary tank 18 may include a combination valve 22 to provide shut-off of primary fluid dispensing provided by a float valve, pressure relief provided by a pressure relief valve set at a minimal pressure, spill prevention provided by a gravity valve, and vacuum relief provided by a vacuum valve to permit air to enter tank 18 as primary fluid 20 is consumed. A fill pipe 26 extends between primary storage tank 18 and terminates at a filler neck 28 adapted for receiving a filling nozzle (not shown) and a removable cap 30.

Secondary fluid storage and distribution system 14 includes a secondary fluid storage tank 40 coupled to a secondary fluid fill tube 42, at least a portion of which 44 is disposed within primary fluid fill pipe 26 to facilitate co-delivery of primary fluid 20 and secondary fluid 50 from a common nozzle having corresponding primary and secondary supply tubes. Depending upon the particular application and implementation, secondary fill tube 42 may include a valve 52 located near the end of fill tube 42 terminating within filler neck 28. For applications having a pressurized secondary fluid system 14, valve 52 may be a one-way valve, such as a check valve, that operates to allow pressurized secondary fluid from the filling nozzle (not shown) to fill secondary tank 40, but prevents secondary fluid from escaping out the terminal end when the filling operation is completed. In one exemplary embodiment, valve 52 is implemented by a check valve having a spring acting on a seating element, such as a ball, to maintain a seal when the spring is not depressed. During co-fueling, the filling nozzle depresses the spring allowing secondary fluid 50 to enter portion 44 of secondary fill tube 42. Other types of valves may be used depending upon the particular application, including but not limited to mechanically, electrically, magnetically, electromagnetically, or pneumatically actuated valves, for example.

In the embodiments illustrated in FIG. 1, secondary fluid storage tank 40 is a bladder-accumulator type tank having an expandable bladder 60 that contains secondary fluid 50 within a rigid tank 62 filled with air or another fluid. However, the present disclosure is independent of the particular type of storage tank 40. Those of ordinary skill in the art will recognize that the teachings of the present disclosure may be applied to pressurized fluid storage systems that do not use a bladder-accumulator type storage tank 40. In addition, the present disclosure may be applied to systems that are not pressurized, but that maintain a fluid in a portion of the fill tube after filling that is undesirable due to subsequent operating conditions.

Pressure control device 64 is coupled to storage tank 40 and is used to modify or control the pressure within secondary fluid storage and distribution system 14 according to the present disclosure as described in greater detail herein. In the illustrated embodiments of FIG. 1, pressure control device 64 includes an air pump 70 that is coupled to tank 62 via one or more controllable valves implemented by solenoid controlled pressure valve 72 and vacuum valve 74. Other embodiments of pressure control device 64 may include a single combination valve to selectively couple a pump or other device to tank 62. Similarly, pressure control device 64 may be implemented by one or more controllable valves directly connected to secondary fluid storage tank 40 to provide controlled venting of tank 40 to atmosphere, for example.

Secondary fluid system 14 may optionally pass through or be contained within a heated region, represented generally by reference numeral 80, to reduce susceptibility of secondary fluid 50 to freezing, or to thaw frozen fluid. Heated region 80 may extend nearly to primary fluid fill pipe 26 and may be used to actively or passively heat secondary fluid 50. For example, appropriate routing of secondary fluid fill tube 42 and/or storage tank 40 near heat rejecting elements of the vehicle such as the engine, radiator, oil pan, exhaust system, etc. may be used to provide passive heating. Alternatively, an engine or vehicle fluid or component, represented generally by reference numeral 84, may be routed near one or more components of secondary fluid storage and distribution system 14 to provide sufficient heat to keep secondary fluid 50 from freezing, or to thaw frozen fluid. For example, automatic transmission fluid, engine coolant, engine lubricating oil, and the like may be routed proximate fill tube 42 and/or storage tank 40. Depending on the particular application, the fluid or fluids used for passive heating may be selectively routed within heating zone 80 only when heating is desired using appropriate control valves. The freezing temperature for secondary fluid 50 will vary depending upon the type of emissions treatment substance and specific formulation. For a representative application using an aqueous solution of urea, freezing may occur at about minus twelve degrees Celsius (−12° C.). For applications using active heating, an electric heating element or similar device, may be positioned near secondary fill tube 42 away from primary fill pipe 26 and energized based on ambient temperature or temperature within a predetermined region or zone of system 14, for example.

System 10 may include one or more optional sensors 76, 78 that may detect operating conditions used to control secondary fluid system 14. For example, one or both sensors 76, 78 may be used to detect the presence, pressure, and/or velocity of secondary fluid 50 moving within secondary fill tube 42. Similarly, one or more sensors 76, 78 may be used to determine temperature, pressure, or other parameters associated with secondary fluid 50 and may be implemented in-line or externally depending upon the particular application and implementation. As those of ordinary skill in the art will appreciate, system 10 includes various conventional sensors 86 and actuators 88 in addition to those illustrated in FIG. 1 to control primary fluid system 12 and secondary fluid system 14. The sensors and actuators communicate with at least one controller 90 that includes a microprocessor 92, also called a central processing unit (CPU), in communication with a memory management unit (MMU) 94. MMU 94 controls movement of data and/or instructions among various computer readable storage media 96 and communicates data to and from CPU 92. The computer readable storage media preferably include volatile and nonvolatile or persistent storage in read-only memory (ROM) 98, keep-alive memory (KAM) 100, and random-access memory 102, for example. KAM 100 may be used to store various engine and/or ambient operating variables while CPU 92 is powered down.

Computer-readable storage media 96 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 92 in controlling system 10. Computer-readable storage media 96 may also include floppy disks, CD-ROMs, hard disks, and the like depending upon the particular application. CPU 92 communicates with the sensors and actuators via an input/output (I/O) interface 104. Interface 104 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 92. Some controller architectures do not contain an MMU 94. If no MMU 94 is employed, CPU 92 manages data and connects directly to ROM 98, KAM 100, and RAM 102. Of course, the present invention could utilize more than one controller 90 or more than one CPU 92 to provide system control and each controller 90 may contain multiple ROM 98, KAM 100, and RAM 102 coupled to MMU 94 or CPU 92 depending upon the particular application.

In operation, during a filling procedure where primary tank 18 and secondary tank 40 are at least partially filled with corresponding fluids, filler cap 30 is removed and a co-fueling nozzle (not shown) is inserted into filler neck 28. Valve 52 may be opened by an appropriate signal, mechanically opened by insertion of the nozzle, or opened by supply fluid pressure, for example. In one embodiment, valve 52 is implemented by a spring-loaded check valve and is operated mechanically by insertion of the nozzle, which seals a secondary fluid supply tube within the nozzle with the terminal end of secondary fluid fill tube 42. Primary fluid flows into primary fill pipe 26 and primary tank 18 while secondary fluid begins flowing into fill tube 42 and bladder 60 of tank 40. Normally closed pressure valve 74 is actuated by controller 90 to vent tank 62 to atmosphere and allow bladder 60 to expand without a corresponding increase in pressure within tank 62 and bladder 60. When bladder 60 (or tank 40 in applications not using a bladder) reaches a predetermined fill level, such as 90%, pressure valve 74 is de-energized (closed) to reapply pressure to tank 40 and stop secondary fluid 50 from flowing into fill tube 42 from the nozzle. Air pump 70 may also be actuated for a predetermined period of time to increase pressure within tank 40 to stop flow of the secondary fluid into fill tube 42. At this point, secondary fluid 50 may be pressurized and remain within fill tube 42 surrounding the spring of check valve 52. When the filling nozzle is removed, valve 52 reseats and prevents secondary fluid 50 from escaping.

After the filling process is completed with tank 40 at least partially filled with secondary fluid 50, controller 90 briefly energizes (opens) normally closed pressure valve 74 to vent tank 62 and reduce pressure within bladder 60, which may result in secondary fluid 50 moving away from the terminal end of fill tube 42 toward bladder 60. Controller 90 then energizes (closes) normally open vacuum valve 72 and operates air pump 70 to evacuate (i.e. lower the pressure below atmosphere) tank 62, which allows bladder 60 to expand and lowers pressure within secondary fluid fill tube 42. Pressure may be lowered sufficiently to draw air into the terminal end of fill tube 42 past valve 52 moving secondary fluid 50 further away from valve 52 and preferably to a point 110 outside of primary fluid fill pipe 26, i.e. beyond portion 44 of fill tube 42. Air pump 70 may be operated to move secondary fluid 50 within heated region 80, which is preferably located away from primary fill pipe 26 to avoid unnecessary vaporization of primary fluid within fill pipe 26. The position of secondary fluid 50 within fill tube 42 may be detected by one or more sensors 76, 78, or may be estimated based on pressure within fill tube 42, tank 62, or based on the length of time that air pump 70 is operated. For example, embodiments of system 14 that do not include sensors to indicate position of fluid 50 may operate air pump 70 for a predetermined amount of time to move fluid 50 away from valve 52 and past the co-located portion 44 of primary and secondary fill tubes 26, 42, respectively. The amount of time may vary depending on the particular secondary fluid or emissions treatment substance, the power of the air pump, and various other considerations. The time period may be empirically determined during design and development of the system.

After operating pressure reducing device 64 to move secondary fluid 50 away from the terminal end of corresponding fill tube 42, controller 90 de-energizes normally open vacuum valve 72 and normally closed pressure valve 74 and operates air pump 70 to pressurize system 14 and facilitate subsequent delivery of secondary fluid 50 to an emissions treatment device or other device through a corresponding distribution/delivery system (not shown). Pressure valve 74 may include an integral air filter, or may receive filtered air from the vehicle air intake system. During pressurization of system 14, valve 52 is closed and prevents air from escaping from fill tube 42 so that secondary fluid does not reach valve 52. As such, any subsequent freezing of secondary fluid 50 that may occur does not adversely impact operation of valve 52 during a subsequent filling.

Figure 2:
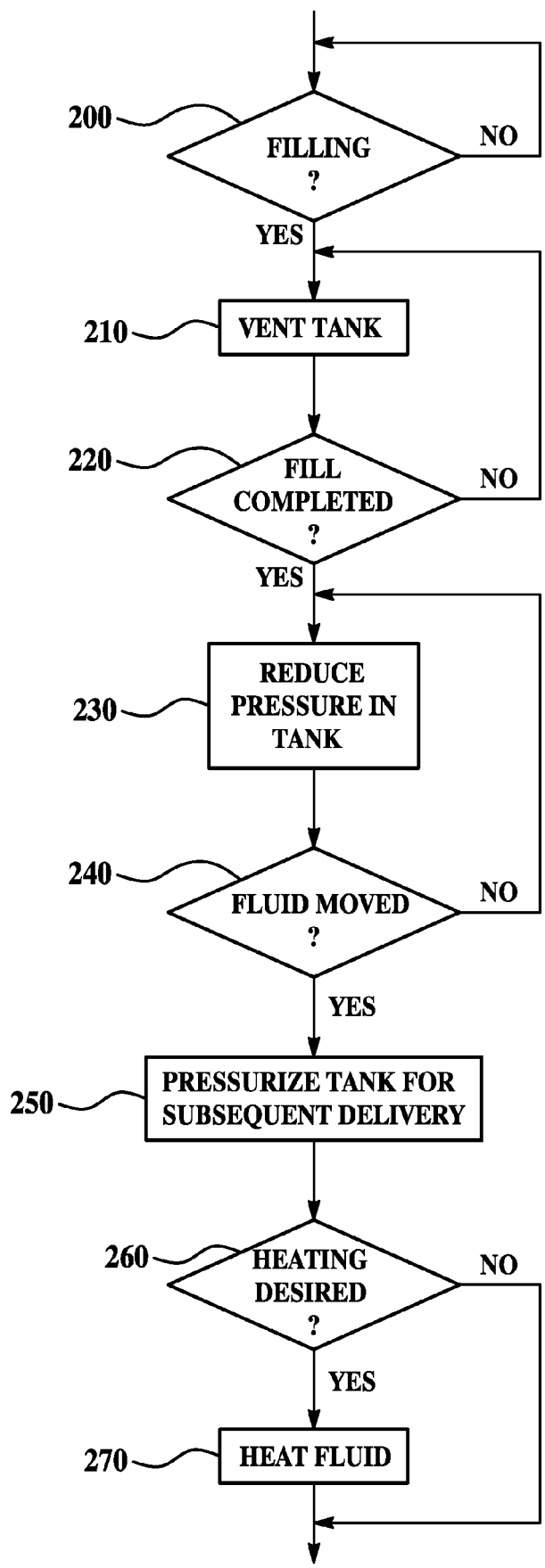
FIG. 2 is flow chart illustrating operation of a system or method for controlling an on-board emissions treatment system according to the present disclosure.

FIG. 2 is a flow chart illustrating operation of a system or method for controlling a secondary fluid storage and distribution system, such as an emissions treatment substance storage and distribution system according to the present disclosure. As those of ordinary skill in the art will appreciate, the diagram of FIG. 2 generally represents a control process or logic, some of which may be implemented by any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending upon the particular processing strategy or implementation.

Steps of the process performed by a controller may be implemented primarily in software executed by a microprocessor-based controller that may be dedicated to controlling the emissions treatment system, or may also be used to control the engine and/or vehicle. Of course, these steps may be implemented in software, hardware, or a combination of software and hardware depending upon the particular application. When implemented in software, the control logic is preferably provided in a computer-readable storage medium having stored data representing instructions executed by a computer or controller to control the system. The computer-readable storage medium or media may be any of a number of known physical devices which utilize electric, magnetic, and/or optical devices to temporarily or persistently store executable instructions and associated calibration information, operating variables, and the like.

Filling of the primary and secondary fluid storage and distribution systems is detected as represented by block 200 of FIG. 2. Pressure within the secondary fluid storage tank is relieved by venting to initiate the filling process as represented by block 210. Completion of the filling process is indicated by block 220. As previously described, the pressure within the secondary fluid storage tank may be maintained or increased by closing a venting valve or operating an air pump, respectively, to complete the filling process. Those of ordinary skill in the art will appreciate that a filling process does not necessarily require complete filling of the secondary fluid storage tank to capacity. After the filling process is completed as indicated at 220, secondary fluid is moved away from the terminal end of the filling tube by reducing pressure within the secondary fluid storage tank as indicated at 230. Pressure may be reduced (or maintained at a reduced level) for a predetermined period of time and/or until the secondary fluid has moved to a predetermined position within the fill tube, such as away from a primary fluid fill tube or within a heated region, as represented by block 240. The reduced pressure draws air into the secondary fluid fill tube past a valve located near the terminal end of the fill tube to prevent the valve from being inoperable if the secondary fluid freezes.

After the secondary fluid has been moved away from the terminal end of the secondary fluid fill tube, and preferably out of the primary fluid fill tube and into a heated region of the system, the secondary fluid storage tank is pressurized to prepare for subsequent delivery of the secondary fluid as represented by block 250. For applications having passive or active heating of the secondary fluid, block 260 may determine whether heating of the secondary fluid is desired. The determination to activate passive or active heating may be made based on various system and/or ambient operating conditions. For example, secondary fluid temperature, ambient temperature, fluid pressure at one or more points within the secondary fluid storage and distribution system, etc. In one embodiment, low fluid pressure at an emissions treatment system dosing valve may indicate that the secondary fluid has frozen and that heating of one or more regions is required. When heating is desired as represented by block 260, the fluid within one or more heating regions may be heated as represented by block 270.

As such, the present disclosure reduces the potential for freezing of components in a secondary fluid storage and distribution system by moving the secondary fluid, which may be used as an emissions treatment substance, away from the co-located filling area after filling. For applications using co-fueling of a primary fuel and urea, the invention prevents formation of urea ice on the spring side of a check valve disposed near the terminal end of the urea fill tube, which would otherwise prevent the check valve from opening and filling of the emissions treatment system.

The present disclosure does not require heating of the emissions treatment substance to reduce the possibility of freezing of fill-related components, such as a valve. However, for applications that include heating of the emissions treatment substance, the present disclosure moves the emissions treatment substance away from the primary fuel/vapor area to an area where it can be passively or actively heated to further reduce the possibility of freezing while avoiding unnecessary heating of the primary fuel.

While the best mode for carrying out the invention has been described in detail, those familiar with the art to which this invention relates will recognize various alternative designs and embodiments for practicing the invention as defined by the following claims.

What is claimed:

1. A system onboard a vehicle for receiving a primary fluid and a secondary fluid from a dispensing system having a nozzle for delivering the primary and secondary fluids, the system comprising:
    a secondary fluid fill tube having at least a portion disposed within a primary fluid fill tube, the primary and secondary fluid fill tubes interfacing with corresponding supply tubes within the nozzle;
    a primary fluid storage tank connected to the primary fluid fill tube;
    a secondary fluid storage tank connected to the secondary fluid fill tube;
    a device coupled to the secondary fluid storage tank that selectively lowers pressure within the secondary fluid storage tank in response to a command signal after at least partially filling the secondary fluid storage tank to move the secondary fluid away from the portion of the secondary fluid fill tube disposed within the primary fluid fill tube.

2. The system of claim 1 wherein the device comprises a controllable valve to selectively vent the secondary storage tank to atmosphere.

3. The system of claim 1 wherein the device comprises an air pump.

4. The system of claim 1 wherein the secondary fluid storage tank includes a bladder disposed within a rigid tank and coupled to the secondary fluid fill tube for storing the secondary fluid, and wherein the device that selectively lowers pressure is coupled to the rigid tank to selectively lower pressure within the rigid tank.

5. The system of claim 1 wherein the device that selectively lowers pressure operates to selectively increase pressure within the secondary fluid storage tank to facilitate distribution of the secondary fluid.

6. The system of claim 1 wherein the device that lowers pressure lowers pressure to a level below atmospheric pressure.

7. The system of claim 1 wherein the device that selectively lowers pressure lowers pressure to open a check valve disposed within a terminal end of the secondary fill tube and draws air from atmosphere into the secondary fluid fill tube.

8. The system of claim 1 further comprising a check valve disposed near a terminal end of the secondary fluid fill tube, wherein the device that lowers pressure lowers the pressure to open the check valve and allow the secondary fluid to move away from the check valve after at least partially filling the secondary fluid tank.

9. The system of claim 1 wherein the device lowers pressure until the secondary fluid moves to a heated region of the vehicle.

10. The system of claim 1 wherein the secondary fluid fill tube is routed near heat rejecting elements of the vehicle to passively heat the secondary fluid during vehicle operation.

11. The system of claim 1 further comprising a heating element positioned near the secondary fill tube away from the primary fluid fill tube.

12. The system of claim 1 further comprising at least one sensor to detect operating conditions used to control the device coupled to the secondary fluid storage tank.

13. The system of claim 12 wherein the at least one sensor detects presence of secondary fluid within an associated portion of the secondary fill tube.

14. The system of claim 1 wherein the device coupled to the secondary fluid storage tank operates to increase pressuring within the secondary fluid storage tank to stop flow of the secondary fluid into the secondary fluid fill tube during filling of the secondary fluid storage tank.

15. The system of claim 1 wherein the device coupled to the secondary fluid storage tank comprises at least one valve operable in response to a command signal.

16. A system onboard a vehicle for receiving a primary fluid and a secondary fluid from a dispensing system having a single nozzle for delivering both the primary and secondary fluids through corresponding supply tubes within the nozzle, the system comprising:
   a secondary fluid fill tube having at least a portion disposed within a primary fluid fill tube, the primary and secondary fluid fill tubes interfacing with the corresponding supply tubes within the nozzle;
   a primary fluid storage tank connected to the primary fluid fill tube;
   a secondary fluid storage tank connected to the secondary fluid fill tube;
   a device coupled to the secondary fluid storage tank that selectively moves the secondary fluid away from the portion of the secondary fluid fill tube disposed within the primary fluid fill tube; and
   a controller in communication with the device for controlling the device to move the secondary fluid.

17. The system of claim 16 wherein the device coupled to the secondary fluid storage tank comprises an air pump.

18. The system of claim 16 wherein the secondary fluid storage tank comprises a rigid outer tank with a flexible inner bladder and wherein the device coupled to the secondary fluid storage tank comprises:
   a solenoid controlled pressure valve;
   a vacuum valve; and
   an air pump coupled, wherein the pressure valve is coupled to a first port of the air pump and the rigid outer tank and the vacuum valve is coupled to a second port of the air pump and the rigid outer tank.

19. A system onboard a vehicle for receiving a primary fluid and a secondary fluid from a dispensing system having a nozzle for delivering the primary and secondary fluids, the system comprising:
   a secondary fluid fill tube having at least a portion co-located with a primary fluid fill tube, the primary and secondary fluid fill tubes interfacing with corresponding supply tubes of the nozzle;
   a primary fluid storage tank connected to the primary fluid fill tube;
   a secondary fluid storage tank connected to the secondary fluid fill tube;
   at least one valve operable in response to a command signal; and
   a controller in communication with the at least one valve that operates the at least one valve in response to detecting completing of a filling event of at least partial filling of the secondary fluid storage tank to move the secondary fluid to a heated region of the vehicle to inhibit subsequent freezing of the secondary fluid.

* * * * *